(12) United States Patent
McMahan et al.

(10) Patent No.: US 12,296,969 B2
(45) Date of Patent: May 13, 2025

(54) LONG THROW LATCH FOR AIRCRAFT SYSTEM

(71) Applicant: Rohr, Inc., Chula Vista, CA (US)

(72) Inventors: Paul F. McMahan, College Station, TX (US); Braskel Phillips, San Diego, CA (US)

(73) Assignee: Rohr, Inc., Chula Vista, CA (US)

( * ) Notice: Subject to any disclaimer, the term of this patent is extended or adjusted under 35 U.S.C. 154(b) by 24 days.

(21) Appl. No.: 18/205,775

(22) Filed: Jun. 5, 2023

(65) Prior Publication Data

US 2024/0400215 A1    Dec. 5, 2024

(51) Int. Cl.
*B64D 29/06*    (2006.01)
*F16B 5/06*    (2006.01)

(52) U.S. Cl.
CPC ............... *B64D 29/06* (2013.01); *F16B 5/06* (2013.01)

(58) Field of Classification Search
CPC .............................. B64D 29/06; E05C 19/145
See application file for complete search history.

(56) References Cited

U.S. PATENT DOCUMENTS

| | | | |
|---|---|---|---|
| 4,743,052 A * | 5/1988 | Stammreich | E05C 19/145 292/113 |
| 5,152,559 A | 10/1992 | Henrichs | |
| 5,620,212 A | 4/1997 | Bourne | |
| 5,984,382 A * | 11/1999 | Bourne | E05C 19/145 292/DIG. 31 |
| 6,036,238 A | 3/2000 | Allament | |
| 9,452,845 B2 | 9/2016 | Renault | |
| 2020/0300011 A1 * | 9/2020 | Micallef | E05C 19/145 |
| 2022/0120115 A1 * | 4/2022 | Helsley | E05B 13/10 |

OTHER PUBLICATIONS

EP Search Report for EP Patent Application No. 24180337.8 dated Nov. 8, 2024.

* cited by examiner

*Primary Examiner* — Andrew H Nguyen
(74) *Attorney, Agent, or Firm* — Getz Balich LLC

(57) ABSTRACT

An apparatus is provided for an aircraft. This apparatus includes a latch, and the latch includes a handle, a hook structure and a linkage system operatively coupling the handle to the hook structure. The linkage system includes a mounting link, a handle link, a handle pivot member and an inter-link pivot member. The hook structure includes a hook, a structure aperture and a structure slot located longitudinally between the hook and the structure aperture. The handle link is pivotally connected to the handle. The handle pivot member is received within the structure aperture. The handle pivot member is pivotally connected the handle to the hook structure. The inter-link pivot member is received within the structure slot. The inter-link pivot member pivotally connects the mounting link and the handle link to the hook structure.

19 Claims, 12 Drawing Sheets

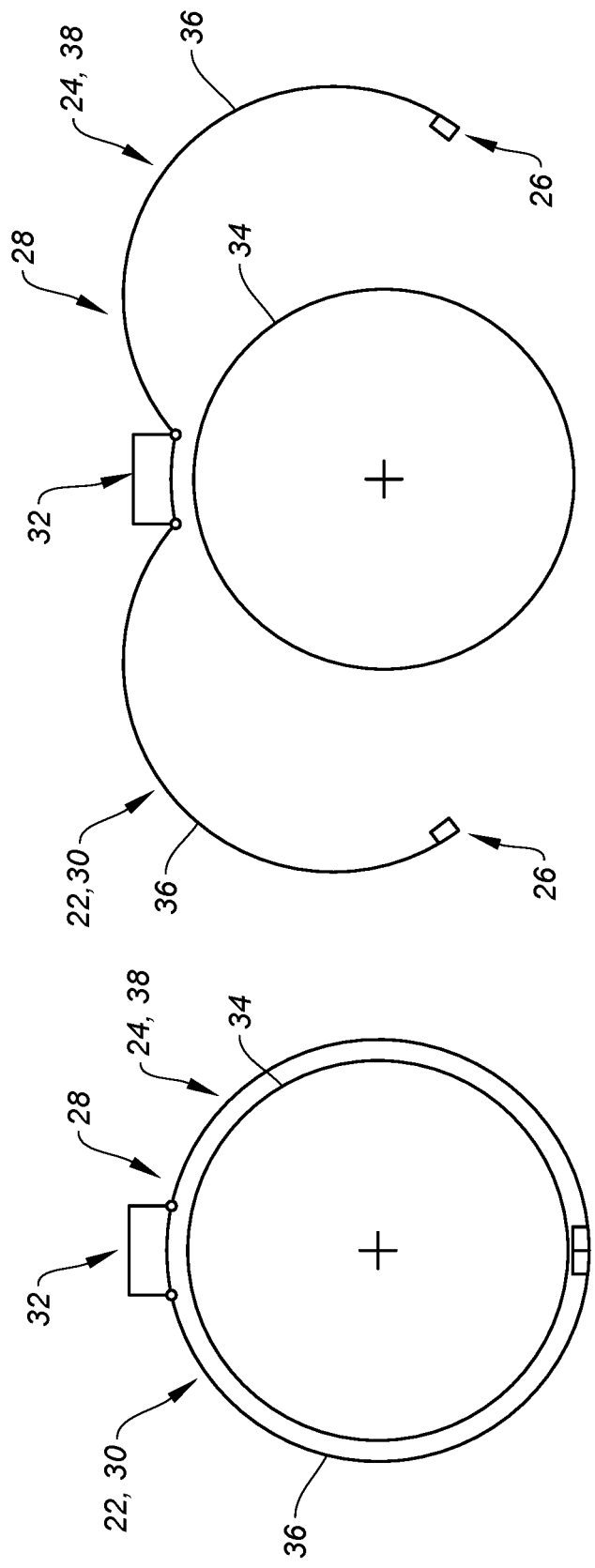

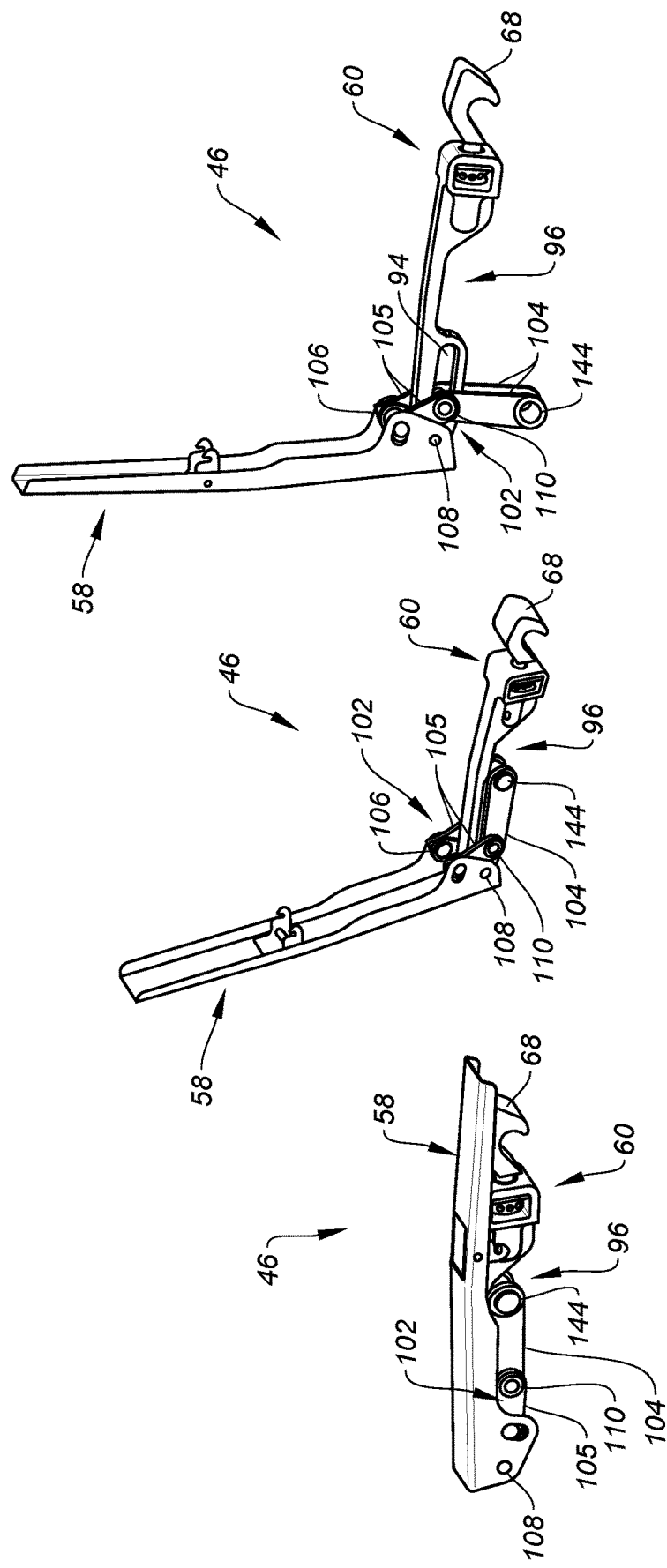

LONG THROW LATCH FOR AIRCRAFT SYSTEM

BACKGROUND

1. Technical Field

This disclosure relates generally to a latch assembly for a structure such as, for example, an aircraft cowl.

2. Background Information

A modern aircraft propulsion system typically includes a gas turbine engine and a nacelle housing and providing an aerodynamic covering for the gas turbine engine. The nacelle may include one or more cowls for covering components of the gas turbine engine. These cowls may be pivotally mounted to a stationary structure enabling those cowls to be opened for providing access to the components underneath. The cowls may be secured in a closed position using one or more latch assemblies. Various types and configurations of latch assemblies are known in the art. While these known latch assemblies have various benefits, there is still room in the art for improvement.

SUMMARY OF THE DISCLOSURE

According to an aspect of the present disclosure, an apparatus is provided for an aircraft. This apparatus includes a latch, and the latch includes a handle, a hook structure and a linkage system operatively coupling the handle to the hook structure. The linkage system includes a mounting link, a handle link, a handle pivot member and an inter-link pivot member. The hook structure includes a hook, a structure aperture and a structure slot located longitudinally between the hook and the structure aperture. The handle link is pivotally connected to the handle. The handle pivot member is received within the structure aperture. The handle pivot member is pivotally connected the handle to the hook structure. The inter-link pivot member is received within the structure slot. The inter-link pivot member pivotally connects the mounting link and the handle link to the hook structure.

According to another aspect of the present disclosure, another apparatus is provided for an aircraft. This apparatus includes a latch fitting, a latch and a fastener. The latch fitting includes a fitting channel. The latch is disposed in the fitting channel. The latch includes a handle, a hook structure and a linkage system operatively coupling the handle to the hook structure. The linkage system includes a mounting link, a handle pivot member and a link pivot member. The hook structure includes a hook, a structure aperture and a structure slot located longitudinally between the hook and the structure aperture. The handle pivot member is received within the structure aperture. The handle pivot member pivotally connects the handle to the hook structure. The link pivot member is received within the structure slot. The link pivot member pivotally connects a back end of the mounting link to the hook structure. The fastener pivotally connects a front end of the mounting link to the latch fitting to mount the latch to the latch fitting.

According to still another aspect of the present disclosure, another apparatus is provided for an aircraft. This apparatus includes a latch and a fastener. The latch includes a handle, a hook structure and a linkage system operatively coupling the handle to the hook structure. The linkage system includes a mounting link, a handle pivot member and a link pivot member. The hook structure includes a hook, a structure aperture, a structure slot and a structure channel. The structure slot is located longitudinally between the structure channel and the structure aperture. The structure channel is located longitudinally between the structure slot and the hook. The handle pivot member is received within the structure aperture. The handle pivot member pivotally connects the handle to the hook structure. The link pivot member is received within the structure slot. The link pivot member pivotally connects the mounting link to the hook structure. The fastener is connected to the mounting link. The fastener is disposed in the structure channel when the latch is in a latched position. The fastener is disposed outside of the structure channel when the latch is in an unlatched position.

The hook structure may also include a structure channel. The fastener may be disposed in the structure channel when the latch is in a latched position. The fastener may be disposed outside of the structure channel when the latch is in an unlatched position.

The link pivot member may be an inter-link pivot member. The linkage system may also include a front handle link and a back handle link. The inter-link pivot member may pivotally connect a front end of the front handle link to the hook structure. A back end of the front handle link may be pivotally connected to the handle and to a front end of the back handle link. The handle pivot member may also pivotally connect a back end of the back handle link to the hook structure.

The apparatus may also include a latch mount pivot member received within a link aperture in the mounting link. The latch mount pivot member may extend laterally across a channel in the hook structure when the latch is in a latched position. The latch mount pivot member may be disposed outside of the channel in the hook structure when the latch is in an unlatched position.

The mounting link may be a first mounting link. The handle link may be a first handle link. The linkage system may also include a second mounting link, a second handle link and a bushing. The hook structure may be disposed laterally between the first mounting link and the second mounting link and laterally between the first handle link and the second handle link. The second handle link may be pivotally connected to the handle. The inter-link pivot member may pivotally connect the second mounting link and the second handle link to the hook structure. The bushing may extend laterally between and may be connected to the first mounting link and the second mounting link.

The hook structure may also include a structure channel. The bushing may be disposed in the structure channel when the latch is in a latched position. The bushing may be disposed outside of the structure channel when the latch is in an unlatched position.

The mounting link may be configured to pivot at least ninety degrees about the inter-link pivot member between a first position and a second position. The mounting link may be in the first position when the latch is in a latched position. The mounting link may be in the second position when the latch is in an unlatched position.

The apparatus may also include a fixed structure, a first aircraft component and a latch mount pivot member. The first aircraft component may be pivotally attached to the fixed structure. The latch mount pivot member may pivotally connect the mounting link to the first aircraft component.

The apparatus may also include a second aircraft component and a keeper. The second aircraft component may be pivotally attached to the fixed structure. The keeper may be connected to the second aircraft component. The handle may be configured to move between a closed position and an open position. The hook structure may be engaged with the keeper when the handle is in the closed position. The hook structure may be disengaged from the keeper when the handle is in the open position.

The apparatus may also include a latching fitting and a fastener. The latch fitting may include a fitting channel. The latch may be disposed within the fitting channel. The fastener may project through an aperture in the mounting link to mount the latch to the latch fitting.

The inter-link pivot member may be configured to translate longitudinally within structure slot as the handle pivots relative to the hook structure.

The handle link may be a front handle link. The linkage system may also include a back handle link. The front handle link may be pivotally connected to the back handle link. The handle pivot member may pivotally connect the back handle link to the hook structure.

The back handle link may include a link aperture. The front handle link may include a protrusion that projects into the link aperture. The protrusion may pivotally connect the front handle link to the back handle link.

The handle may include a handle slot. The handle link may include a protrusion that projects into the handle slot. The protrusion may pivotally connect the handle link to the handle.

The apparatus may also include a keeper. The handle may be configured to move between a closed position and an open position. The hook may be engaged with the keeper when the handle is in the closed position. The hook may be disengaged from the keeper when the handle is in the open position.

The latch may also include a handle release device with a push button. The handle release device may be configured to lock the handle in a closed position when the push button is in a first position. The handle release device may be configured to unlock the handle from the closed position when the push button is in a second position.

The push button may be nested in an aperture in the handle.

The handle release device may be pivotally mounted to the handle.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 3 is a schematic cross-sectional illustration of the aircraft propulsion system with its cowls in closed positions.

FIG. 4 is a schematic cross-sectional illustration of the aircraft propulsion system with its cowls in open positions.

FIGS. 15A-C are perspective illustrations depicting an opening sequence of the latch at various latch positions.

DETAILED DESCRIPTION

Figure 1:
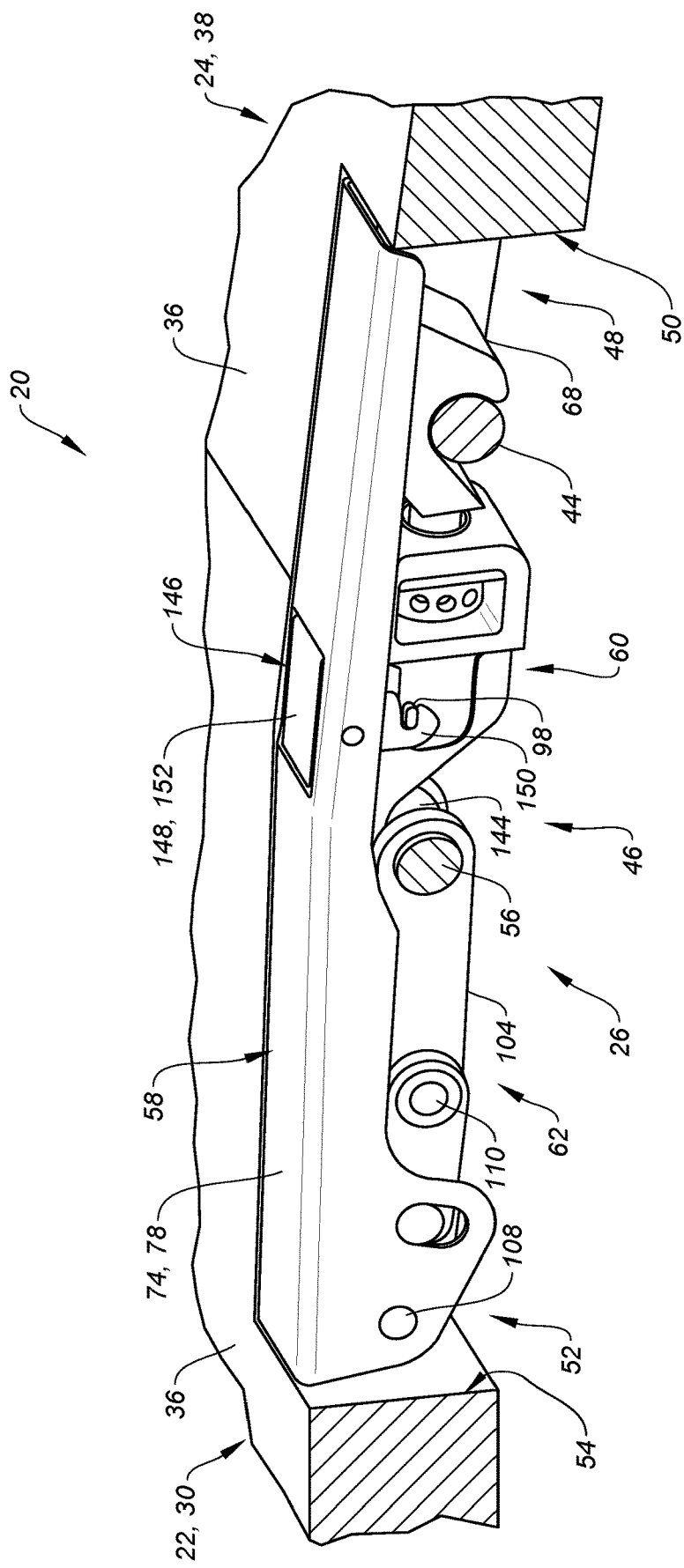
FIG. 1 is a partial cutaway perspective illustration of an aircraft assembly with a latch in a closed position.

FIG. 1 illustrates an assembly 20 for an aircraft structure. An example of the aircraft structure is a nacelle for an aircraft propulsion system, where the nacelle houses an aircraft propulsion system powerplant such as, but not limited to, a gas turbine engine. Another example of the aircraft structure is an aircraft fuselage. The assembly 20 of the present disclosure, however, is not limited to the foregoing exemplary aircraft structures. The assembly 20 of FIG. 1 includes one or more aircraft components 22 and 24 and a long throw latch assembly 26.

Figure 2:
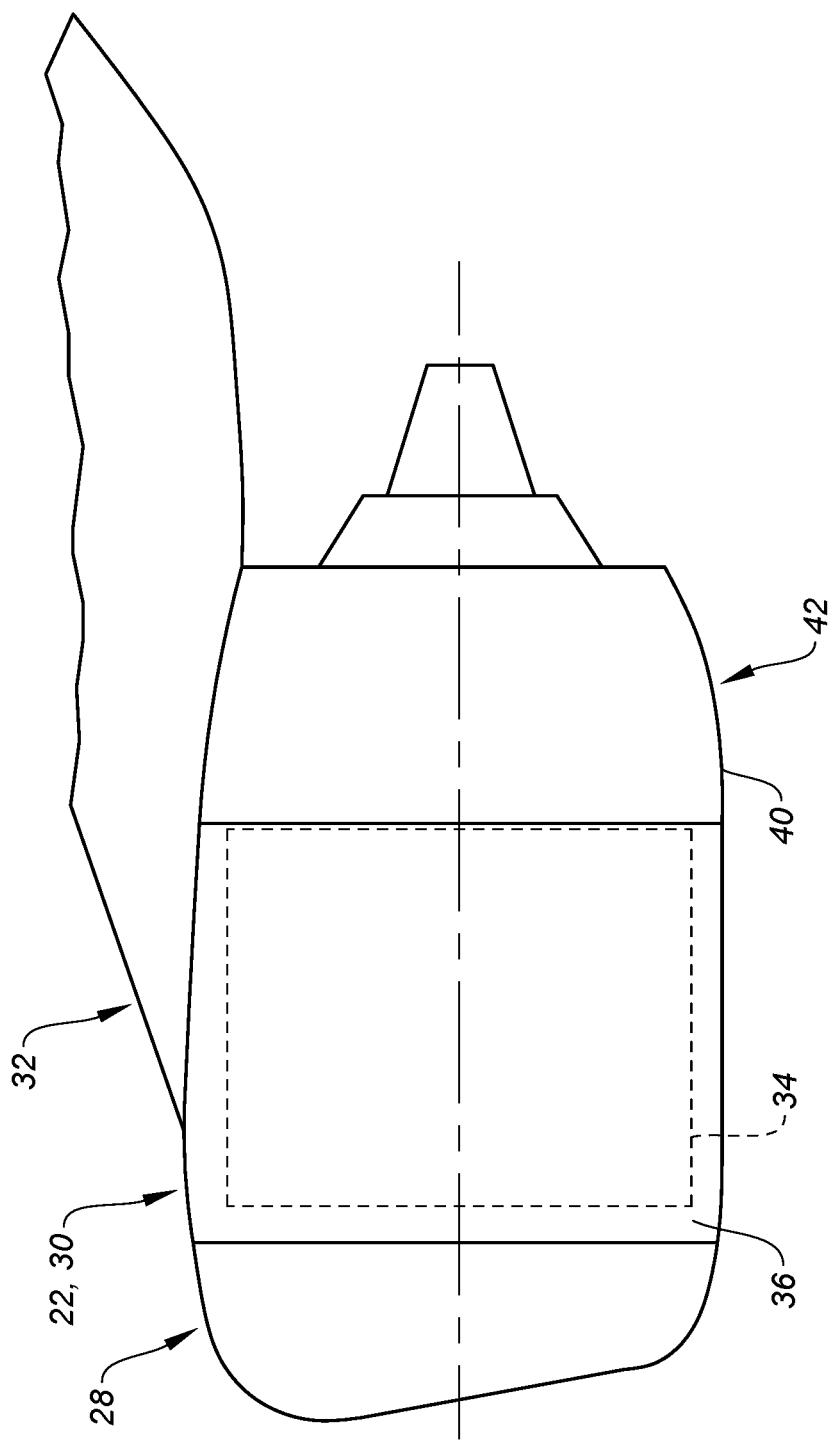
FIG. 2 is a side illustration of an aircraft propulsion system.

Referring to FIGS. 2-4, the first component 22 may be configured as part of an outer nacelle structure 28 for the aircraft propulsion system nacelle. The first component 22 of FIGS. 2-4, for example, may be configured as or otherwise include a first fan cowl 30 of the outer nacelle structure 28. This first fan cowl 30 is movably (e.g., pivotally) connected to a stationary structure 32 of the aircraft; e.g., a pylon structure for the aircraft propulsion system. The first fan cowl 30 is configured to move (e.g., pivot) between a fully closed position (e.g., see FIGS. 2 and 3) and a fully open position (e.g., see FIG. 4). In the closed position of FIG. 3, the first fan cowl 30 is configured to house and provide a first side aerodynamic covering for a fan case 34 for the powerplant. The first fan cowl 30 also partially forms an exterior aerodynamic surface 36 of the aircraft propulsion system nacelle.

The second component 24 may be configured as part of the outer nacelle structure 28. The second component 24 of FIGS. 3 and 4, for example, may be configured as or otherwise include a second fan cowl 38 of the outer nacelle structure 28, which second fan cowl 38 is arranged opposite the first fan cowl 30. This second fan cowl 38 is movably (e.g., pivotally) connected to the stationary structure 32. The second fan cowl 38 is configured to move (e.g., pivot) between a fully closed position (e.g., see FIG. 3) and a fully open position (e.g., see FIG. 4). In the closed position of FIG. 3, the second fan cowl 38 is configured to house and provide a second side aerodynamic covering for the fan case 34. The second fan cowl 38 also further forms the exterior aerodynamic surface 36 of the aircraft propulsion system nacelle.

The aircraft components 22 and 24 may be described herein as the fan cowls 30 and 38 for ease of description. It should be recognized, however, the latch assembly 26 may be configured with other components of the aircraft propulsion system or the aircraft fuselage. For example, referring to FIG. 2, each aircraft component may alternatively be configured as a respective section 40 (e.g., half; one visible in FIG. 2) of a thrust reverser 42, where the thrust reverser section 40 may be movably (e.g., pivotally) attached to the stationary structure 32 or another structure in a similar manner as described above with respect to the respective fan cowl 30, 38. The present disclosure therefore is not limited to any particular aircraft component configurations. Furthermore, while both aircraft components 22 and 24 are described as movable (e.g., pivotable) structures, it is contemplated one of the aircraft components 22, 24 may alternatively be configured as a fixed structure of the aircraft.

Referring again to FIG. 1, the latch assembly 26 is arranged at an interface between the first component 22 and the second component 24. The latch assembly 26 is configured to lock the (e.g., closed) aircraft components 22 and 24 together when the latch assembly 26 is closed/locked. The latch assembly 26 may thereby secure the first component 22 to the second component 24 when the latch assembly 26 is closed/locked. The latch assembly 26 is also configured to unlock the (e.g., closed) aircraft components 22 and 24 when the latch assembly 26 is open/unlocked. The latch assembly 26 may thereby enable movement of the first component 22 relative to the second component 24 (e.g., pivoting open each aircraft component) when the latch assembly 26 is open/unlocked; e.g., see FIG. 5. The latch assembly 26 of FIG. 1 includes a keeper 44 and a long throw latch 46.

The keeper 44 of FIG. 1 is (e.g., fixedly) mounted to the second component 24. The keeper 44, for example, may be disposed within and extend across a channel 48 in a fitting 50 of the second component 24. Each end of the keeper 44 may be connected to a respective side (e.g., flange, wall, etc.) of the second component fitting 50. The keeper 44 may be configured as a pin, a rod, a fastener or any other elongated body that may mate with the latch 46 as described below.

The long throw latch 46 is (e.g., movably) mounted to the first component 22. The long throw latch 46, for example, may be disposed within a channel 52 in a fitting 54 of the first component 22. A latch anchor 56 (e.g., a latch mount pivot member) extends through at least one component of the long throw latch 46 and across the channel 52 in the first component fitting 54. Each end of the latch anchor 56 may be connected to a respective side (e.g., flange, wall, etc.) of the first component fitting 54. The latch anchor 56 forms a pivot axis about which the long throw latch 46 may pivot and move between its closed/locked arrangement (e.g., see FIG. 1) and its open/unlocked arrangement (e.g., see FIG. 5). The latch anchor 56 may be configured as a pin, a rod, a fastener or any other elongated body/pivot member that may mate with the long throw latch 46 as described below.

Figure 6:
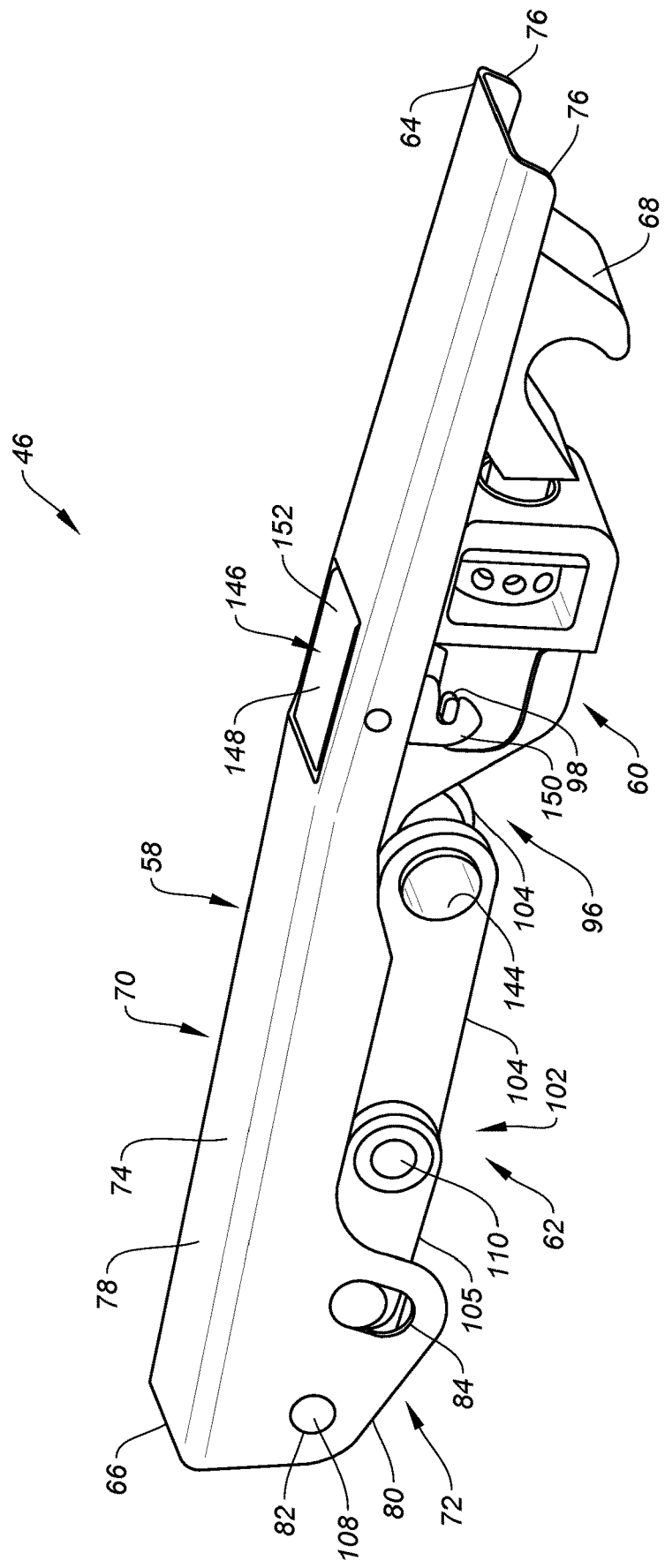
FIGS. 6 and 7 are perspective illustrations of the latch in closed and open positions.
Figure 7:
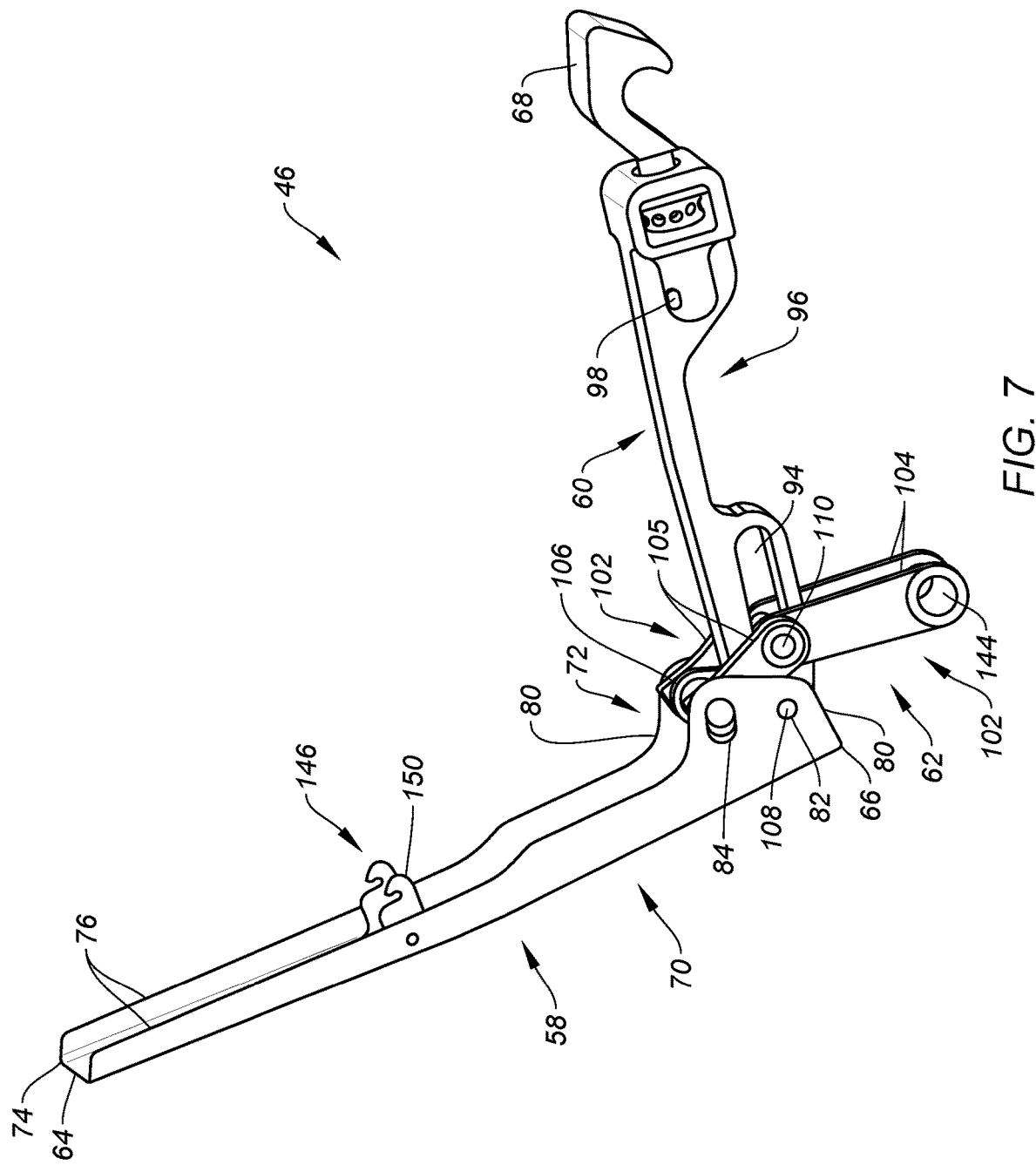

Referring to FIGS. 6 and 7, the long throw latch 46 includes a latch handle 58, a latch hook structure 60 and a latch linkage system 62. This linkage system 62 operatively couples the latch handle 58 to the hook structure 60.

The latch handle 58 extends longitudinally (when closed) between and to a front end 64 of the latch handle 58 and a back end 66 of the latch handle 58. Here, with respect to elements of the long throw latch 46, the terms "front" and "back" are used to describe a position of a respective latch element relative to a hook 68 of the hook structure 60 and need not correspond to front and back positions of the aircraft structure in general. The latch handle 58 includes a grip portion 70 and a mount portion 72.

The grip portion 70 is connected to the mount portion 72 and projects longitudinally to the handle front end 64. The grip portion 70 of FIGS. 6 and 7 includes a handle base 74 and a plurality of handle rails 76. The handle base 74 forms an exterior of the latch handle 58 when the latch handle 58 is in a fully closed position (see FIG. 6). The handle base 74 of FIG. 1, for example, forms an exterior surface 78 of the latch handle 58 that may be substantially inline with (e.g., parallel and/or flush with) the exterior aerodynamic surface 36 when the latch handle 58 is in its closed position and, more generally, when the latch assembly 26 is closed/locked. Referring again to FIGS. 6 and 7, the handle rails 76 are disposed to (e.g., on) opposing lateral sides of the handle base 74 and, more generally, the latch handle 58 and its grip portion 70. Each of the handle rails 76 is connected to the handle base 74 and extends longitudinally along the handle base 74. Each of the handle rails 76 projects vertically inward (e.g., a direction away from the exterior surface 78) from the handle base 74.

The mount portion 72 is arranged at (e.g., on, adjacent or proximate) the handle back end 66. The mount portion 72 of FIGS. 6 and 7 includes a plurality of handle mounts 80; e.g., tabs, flanges, etc. Each of the handle mounts 80 may be formed as an extension of a respective one of the handle rails 76. Each handle mount 80 of FIGS. 6 and 7 projects vertically inward from the respective handle rail 76. Each handle mount 80 projects longitudinally along the grip portion 70 of the respective handle rail 76 to the handle back end 66. Each handle mount 80 of FIGS. 6 and 7 includes a handle mounting aperture 82 ("handle aperture") and a handle retaining slot 84 ("handle slot"). The handle aperture 82 is disposed at the handle back end 66. This handle aperture 82 may be configured as a cylindrical hole which projects laterally through the respective handle mount 80. The handle slot 84 is positioned at a front end of the mount portion 72, and longitudinally between the handle aperture 82 and the handle front end 64. This handle slot 84 extends substantially (or completely) vertically within the respective handle mount 80 along a major axis of the handle slot 84. The handle slot 84 extends laterally through the respective handle mount 80.

Figure 8:
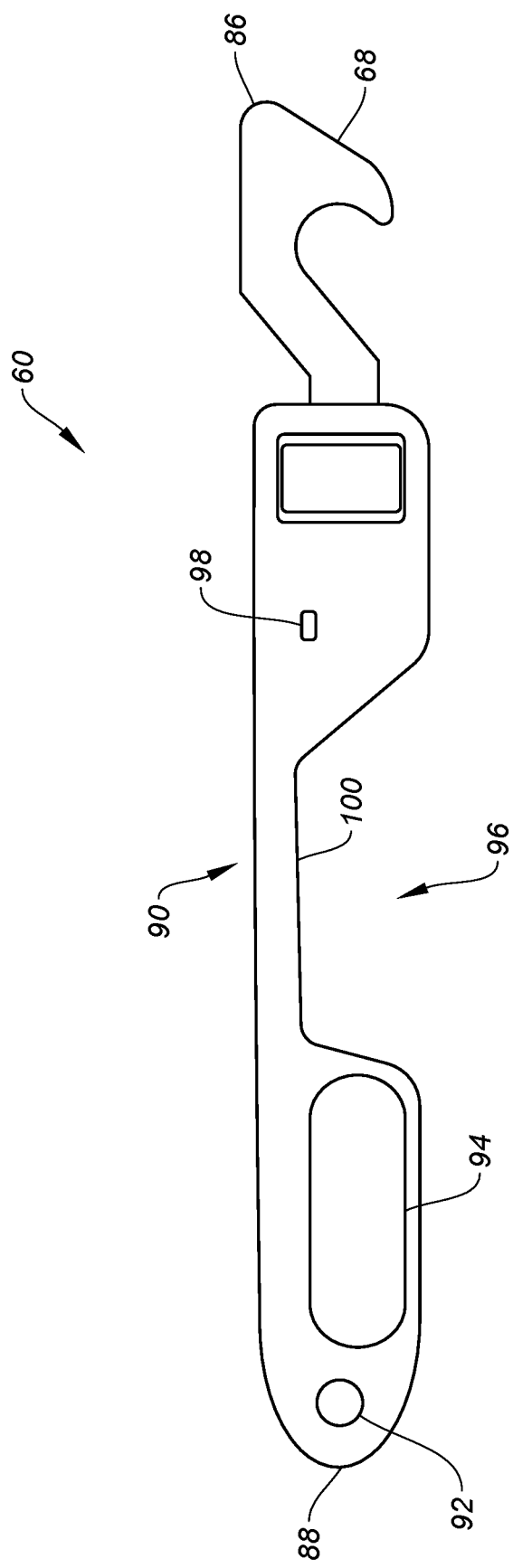
FIG. 8 is an illustration of a hook structure for the latch.

Referring to FIG. 8, the hook structure 60 extends longitudinally (when closed) between and to a front end 86 of the hook structure 60 and a back end 88 of the hook structure 60. The hook structure 60 includes a hook structure base 90 and the structure hook 68 connected to the structure base 90 at the structure front end 86.

The structure base 90 extends longitudinally from the structure back end 88 to the structure hook 68. The structure base 90 includes a hook structure mounting aperture 92 ("structure aperture"), a hook structure slot 94 and a (e.g., open) hook structure channel 96. The structure base 90 may also include one or more catches 98 (one visible in FIG. 8); e.g., protrusions, posts, etc.

The structure aperture 92 is disposed at the structure back end 88. This structure aperture 92 may be configured as a cylindrical hole which projects laterally through the structure base 90.

The structure slot 94 is located longitudinally between (a) the structure aperture 92 and (b) the structure channel 96/the structure hook 68 along the hook structure 60. This structure slot 94 extends longitudinally within the hook structure 60 and its structure base 90 along a major axis of the structure slot 94. The structure slot 94 extends laterally through the hook structure 60 and its structure base 90. The structure slot 94 extends vertically within the hook structure 60 and its structure base 90 along a minor axis of the structure slot 94.

The structure channel 96 is located longitudinally between (a) the structure aperture 92/the structure slot 94 and (b) the structure hook 68 along the hook structure 60. This structure channel 96 extends longitudinally within the hook structure 60 and its structure base 90 along a major axis of the structure channel 96. A major axis length of the structure channel 96 may be equal to or different (e.g., greater) than a major axis length of the structure slot 94. The structure channel 96 extends laterally through the hook structure 60 and its structure base 90. The structure channel 96 of FIG. 8 is configured as an open channel. The structure channel 96, for example, projects partially vertically into the hook structure 60 and the structure base 90 to a vertical (e.g., outer) side 100 of the structure channel 96.

The catches 98 are arranged on opposing lateral sides of the structure base 90. Each of the catches 98 is located longitudinally between the structure slot 94 and the structure hook 68. Each of the catches 98 projects laterally out from a base (e.g., a beam) of the structure base 90 to a distal end of the respective catch 98.

Referring to FIGS. 6 and 7, the linkage system 62 includes one or more sets of linkages 102. These linkage sets 102 are arranged on opposing lateral sides of the hook structure 60. Each linkage set 102 of FIGS. 6 and 7 includes a mounting link 104, a front handle link 105 ("front link") and a back handle link 106 ("back link"), where each of these links 104-106 may be configured as a fixed length, unitary (e.g., single body) linkage arm; e.g., a strut. The linkage system 62 of FIGS. 6 and 7 also includes a handle pivot member 108 and an inter-link pivot member 110 ("link pivot member"). Briefly, each pivot member 108, 110 may be configured as a pin, a rod, a fastener, a sleeve (e.g., a bushing) or any other elongated (e.g., cylindrical) body.

Figure 9:
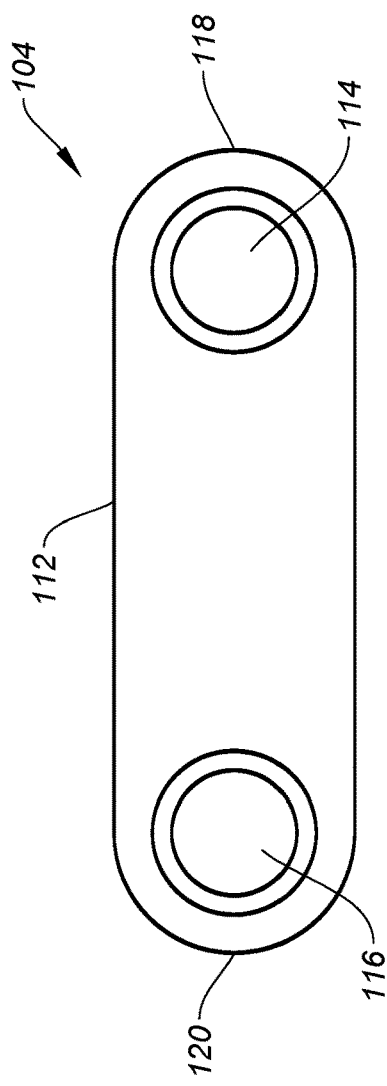
FIG. 9 is an illustration of a mounting link for the latch.

Referring to FIG. 9, the mounting link 104 includes a mounting link base 112, a front mounting link aperture 114 and a back mounting link aperture 116. The mounting link 104 and its mounting link base 112 extend longitudinally between and to a front end 118 of the mounting link 104 and a back end 120 of the mounting link 104. The front mounting link aperture 114 is disposed at the front end 118 of the mounting link 104. The back mounting link aperture 116 is disposed at the back end 120 of the mounting link 104. Each of these mounting link apertures 114, 116 may be configured as a cylindrical hole which extends laterally through the mounting link 104 and its mounting link base 112.

Figure 10:
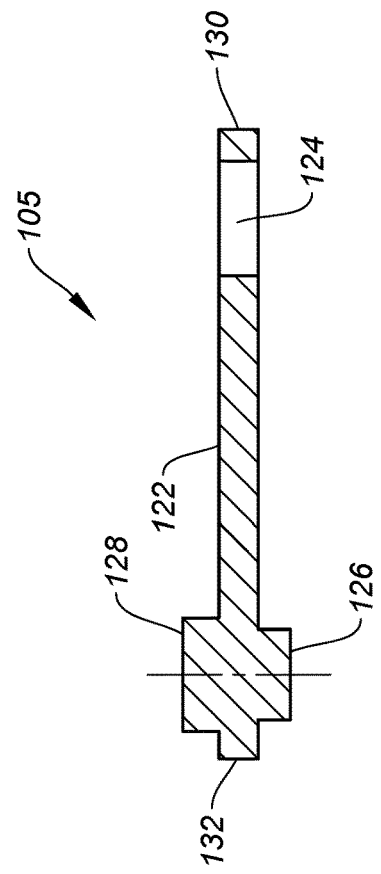
FIG. 10 is a sectional illustration of a front handle link for the latch.

Referring to FIG. 10, the front link 105 includes a front link base 122 and a front link aperture 124. The front link 105 of FIG. 10 also includes one or more front link mounts 126 and 128; e.g., cylindrical protrusions such as bosses. The front link 105 and its front link base 122 extend longitudinally between and to a front end 130 of the front link 105 and a back end 132 of the front link 105. The front link aperture 124 is disposed at the front end 130 of the front link 105. The front link aperture 124 may be configured as a cylindrical hole which extends laterally through the front link 105 and its front link base 122. The handle front link mount 126 is disposed to a first side of the front link base 122 and at the back end 132 of the front link 105. The handle front link mount 126 is connected to and projects laterally out from the front link base 122 (e.g., in a direction away from the hook structure 60; see FIG. 12) to a distal end of the handle front link mount 126. The back link-front link mount 128 is disposed to a second side of the front link base 122 and at the back end 132 of the front link 105. The back link-front link mount 128 is connected to and projects laterally out from the front link base 122 (e.g., in a direction away towards the hook structure 60; see FIG. 12) to a distal end of the back link-front link mount 128. The back link-front link mount 128 may be co-axial with the handle front link mount 126.

Figure 11:
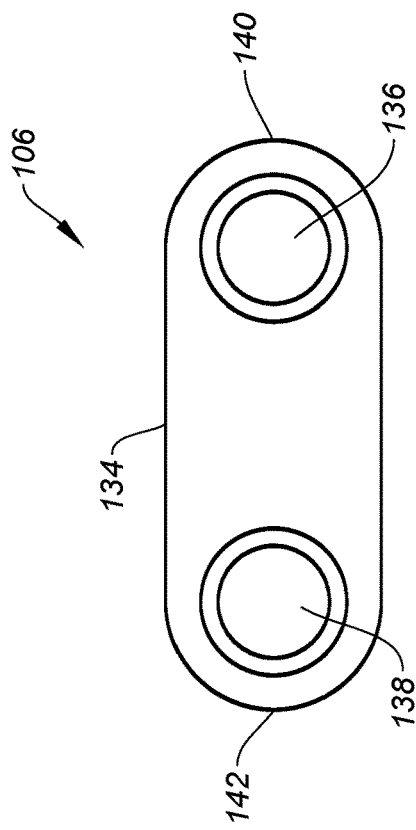
FIG. 11 is an illustration of a back handle link for the latch.

Referring to FIG. 11, the back link 106 includes a back link base 134, a front-back link aperture 136 and a back-back link aperture 138. The back link 106 and its back link base 134 extend longitudinally between and to a front end 140 of the back link 106 and a back end 142 of the back link 106. The front-back link aperture 136 is disposed at the front end 140 of the back link 106. The back-back link aperture 138 is disposed at the back end 142 of the back link 106. Each of these back link apertures 136, 138 may be configured as a cylindrical hole which extends laterally through the back link 106 and its back link base 134.

Figure 12:
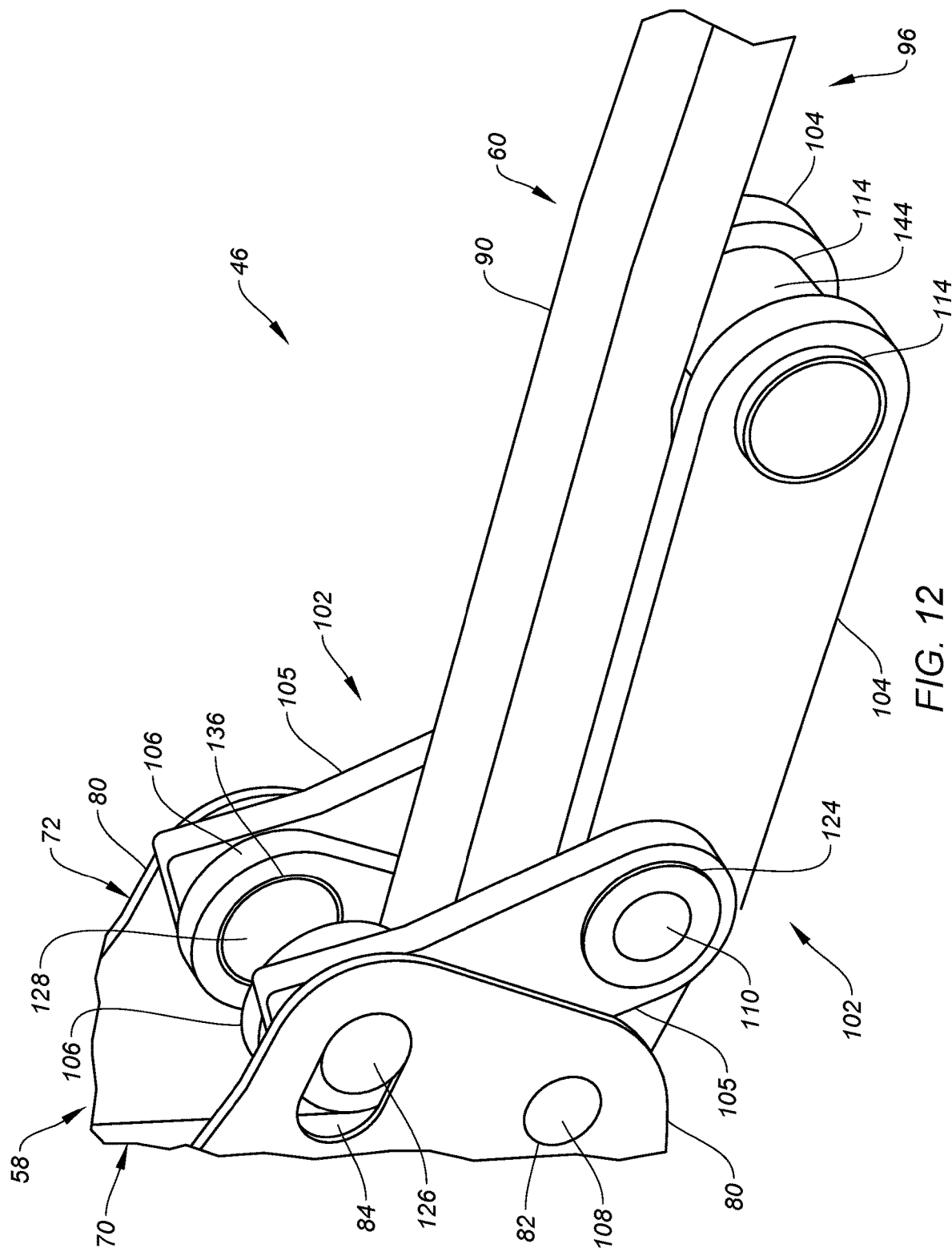
FIGS. 12 and 13 are partial perspective illustrations of the latch with its linkages in various arrangements.
Figure 13:
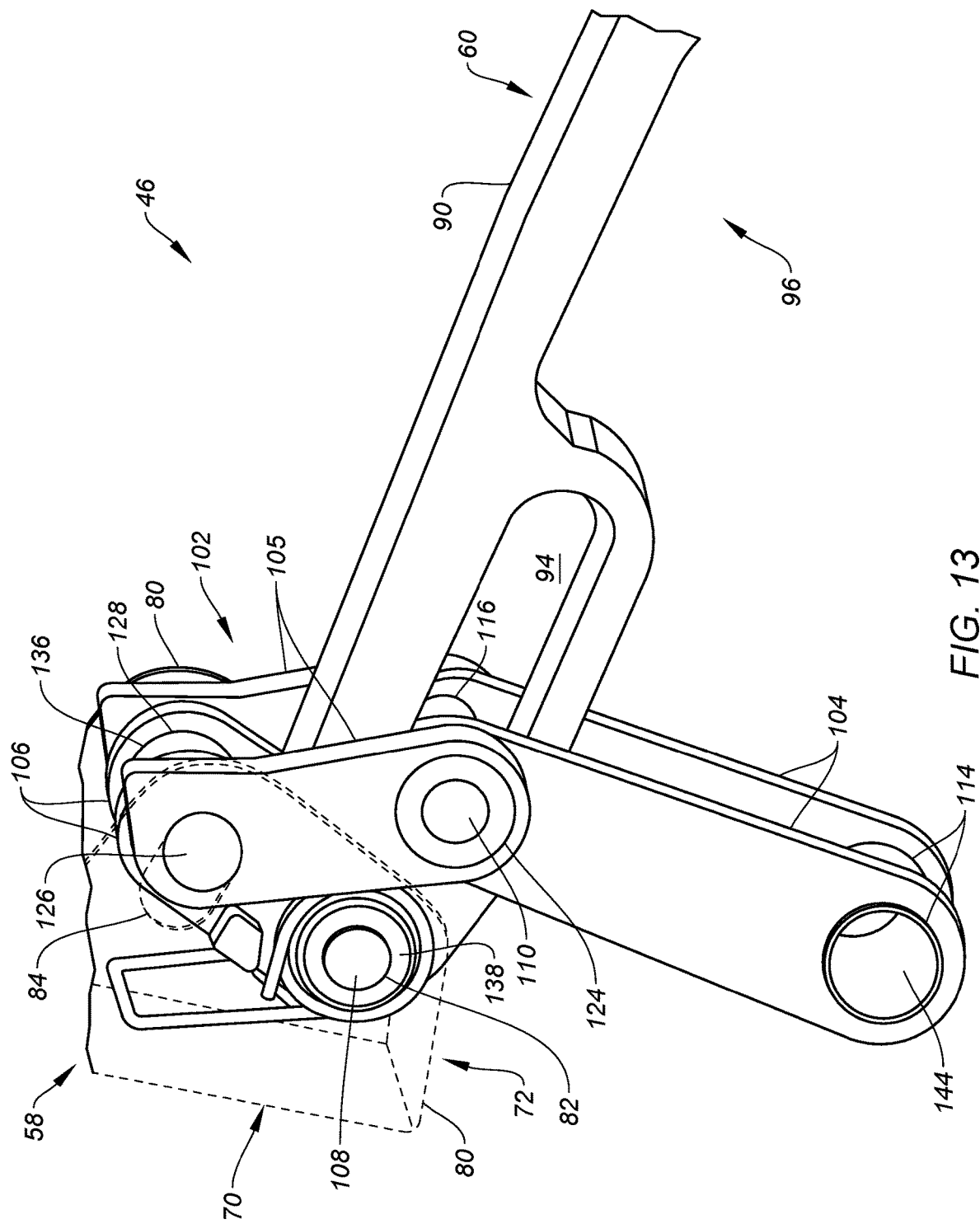

Referring to FIGS. 12 and 13, within each linkage set 102, the handle front link mount 126 is mated with a respective handle slot 84. The handle front link mount 126, for example, projects laterally into (or through) and is pivotable within the respective handle slot 84. The front link 105 may thereby be pivotally connected to the latch handle 58 as well as translatable within and along the handle slot 84. The back link-front link mount 128 is similarly mated with the front-back link aperture 136. The back link-front link mount 128, for example, projects laterally into (or through) and is pivotable within the front-back link aperture 136. The front link 105 may thereby be pivotally connected to the back link 106.

The handle pivot member 108 is mated with (e.g., received by and/or pivotable within) the structure aperture 92 (see FIG. 8), the back-back link apertures 138 (see FIG. 13) in both back links 106 as well as the handle apertures 82 in both handle mounts 80. The handle pivot member 108, for example, projects sequentially laterally through the handle aperture 82 in a first of the handle mounts 80, the back-back link aperture 138 in a first of the back links 106, the structure aperture 92, the back-back link aperture 138 in a second of the back links 106, and the handle aperture 82 in a second of the handle mounts 80. The handle pivot member 108 may thereby pivotally connect the hook structure 60, each of the back links 106 and the latch handle 58 together about a common axis.

The link pivot member 110 is mated with (e.g., received by and/or pivotable within) the structure slot 94, the back mounting link apertures 116 in both mounting links 104 as well as the front link apertures 124 in both front links 105. The link pivot member 110, for example, projects sequentially laterally through the front link aperture 124 in a first of the front links 105, the back mounting link apertures 116 in a first of the mounting links 104, the structure slot 94, the back mounting link apertures 116 in a second of the mounting links 104 and the front link aperture 124 in a second of the front links 105. The link pivot member 110 may thereby pivotally connect the hook structure 60, each of the mounting links 104 and each of the front links 105. The link pivot member 110 may also move (e.g., longitudinally translate, slide, etc.) through the structure slot 94 longitudinally to and away from the structure hook 68.

Figure 5:
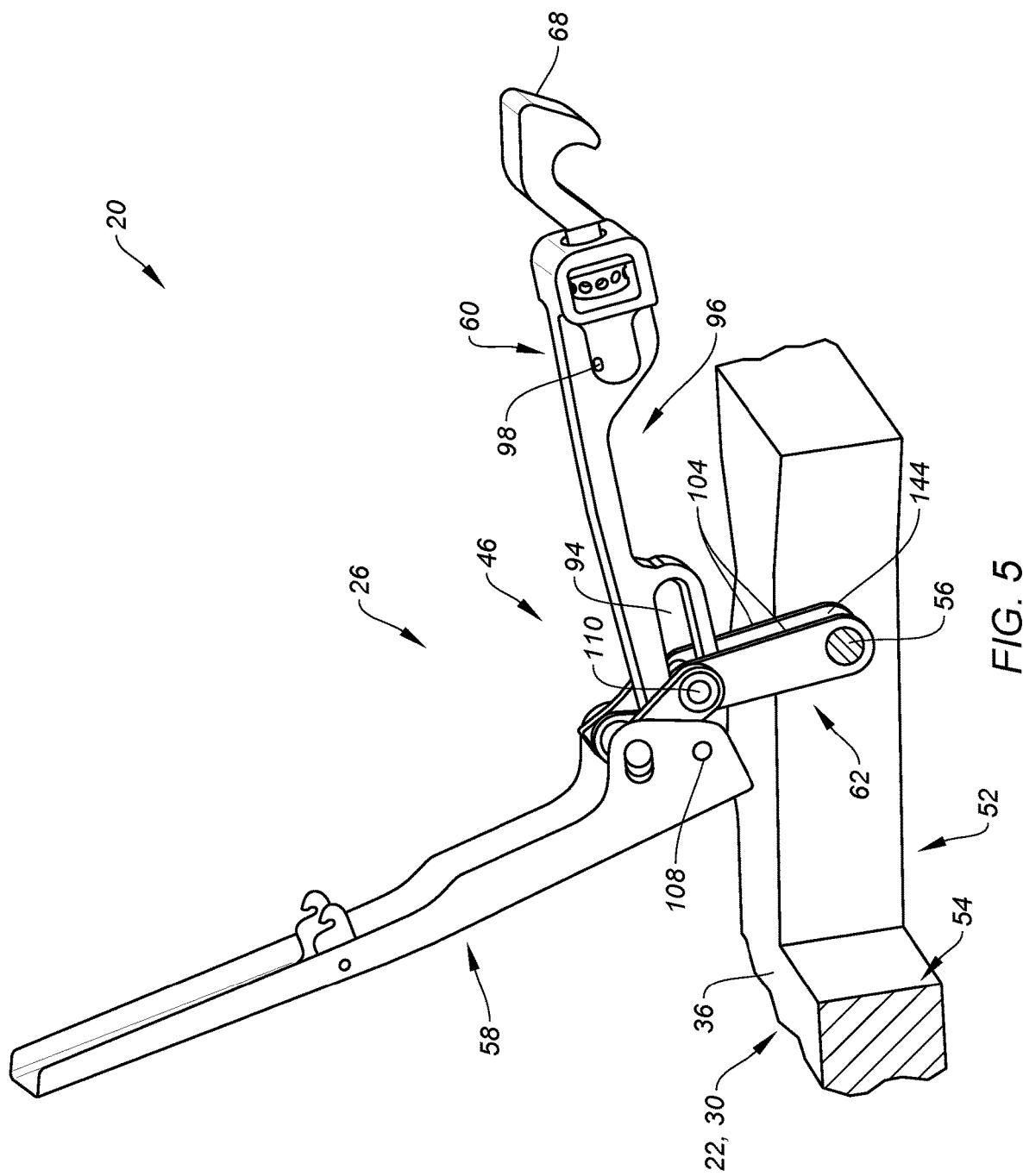
FIG. 5 is a partial cutaway perspective illustration of the aircraft assembly with its latch in an open position.

A mounting bushing 144 may be mated with the front mounting link apertures 114 in both mounting links 104. The mounting bushing 144, for example, extends laterally across a gap between the mounting links 104 and projects into (or through) the front mounting link apertures 114. The mounting bushing 144 of FIGS. 12 and 13 is fixedly secured to the mounting links 104; however, the present disclosure is not limited to such an exemplary arrangement. Referring to FIGS. 1 and 5, the latch anchor 56 may extend laterally through a bore of the mounting bushing 144 to pivotally connect the mounting links 104 and, more generally, the long throw latch 46 to the first component 22. It is contemplated, however, the mounting bushing 144 may be omitted and the latch anchor 56 may directly engage (e.g., contact) the mounting links 104.

Referring to FIGS. 6 and 7, a handle release device 146 is pivotally coupled to the latch handle 58. The handle release device 146, for example, includes a push button 148 (e.g., a planar panel) and a device latch 150. The device latch 150 is connected to and projects out from the push button 148. This device latch 150 may be pivotally coupled to the grip portion 70 and its handle rails 76 by a pin connection. With this arrangement, the handle release device 146 may pivot between a first (e.g., locked) position (e.g., see FIG. 14A) and a second (e.g., unlocked) position (e.g., see FIG. 14B). In the first position of FIGS. 14A, the push button 148 may be seated in an aperture (e.g., a port) through the grip portion 70 and its handle base 74. The push button 148 and an exterior surface 152 of that push button 148 may be inline with (e.g., parallel and/or flush with) the exterior aerodynamic surface 36 (see FIG. 1) and/or the handle base 74 and its exterior surface 78. The push button 148 may thereby be in an undepressed position. Here, the device latch 150 may engage (e.g., latch onto) the catches 98 (one visible in FIG. 14A). With the handle release device 146 in its first position, the handle release device 146 may lock (e.g., secure) the latch handle 58 closed. By contrast, in the second position of FIG. 14B, the push button 148 may project into the latch handle 58 and the push button 148 and its exterior surface 152 may be angularly offset from the handle base 74 and/or the exterior aerodynamic surface 36. The push button 148 may thereby be in a depressed position. Here, the device latch 150 may disengage (e.g., release) the catch 98. With the handle release device 146 in its second position, the handle release device 146 unlocks the latch handle 58.

Referring to FIGS. 15A-C, the latch handle 58 is configured to move from a fully closed position (see FIG. 15A; see also FIG. 1) to a partially open position (see FIG. 15B). The latch handle 58 is also configured to move from the partially open position (see FIG. 15B) to a fully open position (see FIG. 15C; see also FIG. 5).

In the closed position of FIG. 1, the long throw latch 46 and its members may be disposed within the fitting channels 48 and 52 and the handle base 74 and the push button 148 may be inline with the exterior aerodynamic surface 36. The hook structure 60 may also engage the keeper 44. More particularly, the structure hook 68 may latch onto (e.g., grasp, partially wrap around and contact, etc.) the keeper 44. With this closed/locked latch assembly arrangement, the long throw latch 46 may be locked onto the keeper 44 and the latch assembly 26 may maintain/secure the aircraft components 22 and 24 in their closed positions. In addition, the latch anchor 56 (and the mounting bushing 144) are disposed within the structure channel 96.

Figure 14B:
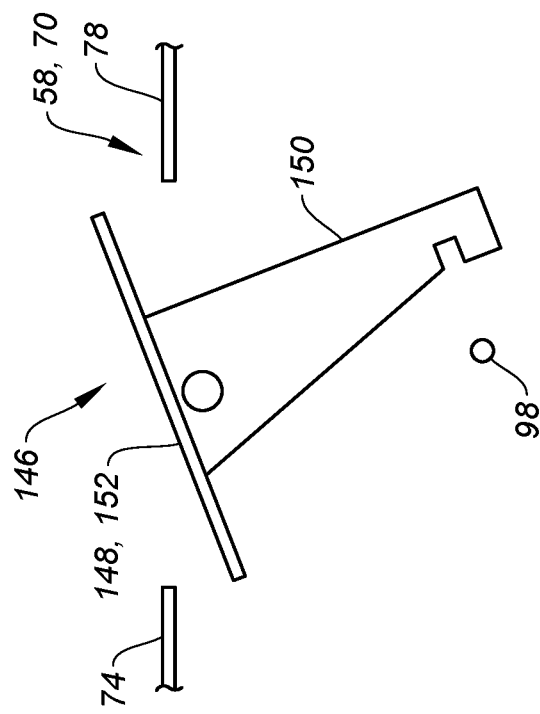
FIGS. 14A and 14B are schematic sectional illustrations of a portion of the latch assembly with a handle release device in various positions.
Figure 14A:
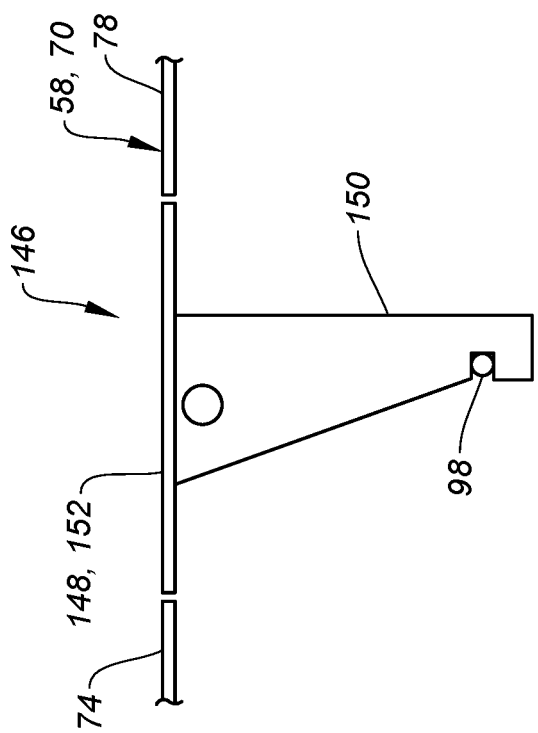

To open the long throw latch 46, the push button 148 may be depressed to disengage the device latch 150 from the catch 98 as described above; e.g., see FIGS. 14A and 14B. The latch handle 58 may then be pulled open. The latch handle 58, for example, may be rotated about the handle pivot member 108 in an outward direction away from the structure hook 68; see latch handle movement from FIG. 15A to FIG. 15B. During this movement, each set of handle linkages 102 may fold (e.g., scissor) closed pulling the link pivot member 110 longitudinally through the structure slot 94 away from the structure hook 68/towards the structure aperture 92 (see FIG. 8). The latch anchor 56 (see FIGS. 1 and 5) may in turn move longitudinally through the structure channel 96 (see also FIG. 8) from the structure hook 68/towards the structure aperture 92 (see FIG. 8); however, the latch anchor 56 may remain located within the structure channel 96. With this movement, the structure hook 68 moves away from the structure hook 68 allowing the aircraft components 22 and 24 to move slightly away from one another and/or facilitating initial disengagement between the structure hook 68 and the keeper 44. Once the latch handle 58 is (e.g., fully) opened to the position of FIG. 15B, the latch handle 58 may be pulled outward (e.g., away from the aircraft components 22 and 24 of FIG. 1) and rotated in a direction back towards the structure hook 68. This movement may rotate the mounting links 104 relative to the hook structure 60 (e.g., 70, 80, 90 or more degrees) about the link pivot member 110. The movement may also rotate the mounting links 104 relative to the first component fitting 54 of FIG. 1 (e.g., 70, 80, 90 or more degrees) about the latch anchor 56. This rotation moves (e.g., pivots) the latch anchor 56 of FIG. 5 out of the structure channel 96. The structure hook 68 may thereby completely disengage from the keeper 44 and facilitate opening the of the aircraft components 22 and 24 of FIG. 1. With the arrangement of FIGS. 15A-C, the secondary movement from FIG. 15B to FIG. 15C may facilitate a longer throw (e.g., longitudinal movement of the structure hook 68) than the initial movement from FIG. 15A to FIG. 15B and/or a typical throw. By facilitating the above double action movement from the close position of FIG. 15A to the partial open position of FIG. 15B, and then from the partial open position of FIG. 15B to the open position of FIG. 15C, the long throw latch 46 of the present disclosure increases (e.g., doubles or triples) its throw compared to a traditional prior art latch with a two link actuation mechanism.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft, comprising:
a latch including a handle, a hook structure and a linkage system operatively coupling the handle to the hook structure, the linkage system including a mounting link, a handle link, a handle pivot member and an inter-link pivot member; and
a latch mount pivot member received within a link aperture in the mounting link;
the hook structure including a hook, a structure aperture and a structure slot located longitudinally between the hook and the structure aperture;
the handle link pivotally connected to the handle;
the handle pivot member received within the structure aperture, and the handle pivot member pivotally connecting the handle to the hook structure;
the inter-link pivot member received within the structure slot, and the inter-link pivot member pivotally connecting the mounting link and the handle link to the hook structure;
the latch mount pivot member extending laterally across a channel in the hook structure when the latch is in a latched position; and
the latch mount pivot member disposed outside of the channel in the hook structure when the latch is in an unlatched position.

2. The apparatus of claim 1, wherein
the mounting link is a first mounting link, the handle link is a first handle link, and the linkage system further includes a second mounting link, a second handle link and a bushing;

the hook structure is disposed laterally between the first mounting link and the second mounting link and laterally between the first handle link and the second handle link;

the second handle link is pivotally connected to the handle;

the inter-link pivot member further pivotally connects the second mounting link and the second handle link to the hook structure; and the bushing extends laterally between and is connected to the first mounting link and the second mounting link.

3. The apparatus of claim 2, wherein
the bushing is disposed in the channel in the hook structure when the latch is in the latched position; and
the bushing is disposed outside of the channel in the hook structure when the latch is in the unlatched position.

4. The apparatus of claim 2, further comprising:
a latch fitting comprising a fitting channel;
the latch disposed within the fitting channel; and
the latch mount pivot member is a fastener projecting through the link aperture in the first mounting link to mount the latch to the latch fitting.

5. The apparatus of claim 1, wherein
the mounting link is configured to pivot at least ninety degrees about the inter-link pivot member between a first position and a second position;
the mounting link is in the first position when the latch is in the latched position; and
the mounting link is in the second position when the latch is in the unlatched position.

6. The apparatus of claim 1, further comprising:
a fixed structure; and
a first aircraft component pivotally attached to the fixed structure; and
the latch mount pivot member pivotally connecting the mounting link to the first aircraft component.

7. The apparatus of claim 6, further comprising:
a second aircraft component pivotally attached to the fixed structure; and
a keeper connected to the second aircraft component;
the handle configured to move between a closed position and an open position;
the hook structure engaged with the keeper when the handle is in the closed position; and
the hook structure disengaged from the keeper when the handle is in the open position.

8. The apparatus of claim 1, wherein the inter-link pivot member is configured to translate longitudinally within the structure slot as the handle pivots relative to the hook structure.

9. The apparatus of claim 1, wherein
the handle link is a front handle link, and the linkage system further includes a back handle link;
the front handle link is pivotally connected to the back handle link; and
the handle pivot member further pivotally connects the back handle link to the hook structure.

10. The apparatus of claim 9, wherein
the back handle link comprises a second link aperture; and
the front handle link comprises a protrusion that projects into the second link aperture, and the protrusion pivotally connects the front handle link to the back handle link.

11. The apparatus of claim 1, wherein
the handle comprises a handle slot; and the handle link comprises a protrusion that projects into the handle slot, and the protrusion pivotally connects the handle link to the handle.

12. The apparatus of claim 1, further comprising:
a keeper;
the handle configured to move between a closed position and an open position;
the hook engaged with the keeper when the handle is in the closed position; and
the hook disengaged from the keeper when the handle is in the open position.

13. The apparatus of claim 1, wherein
the latch further includes a handle release device with a push button;
the handle release device is configured to lock the handle in a closed position when the push button is in a first position;
the handle release device is configured to unlock the handle from the closed position when the push button is in a second position.

14. The apparatus of claim 13, wherein the push button is nested in an aperture in the handle.

15. The apparatus of claim 13, wherein the handle release device is pivotally mounted to the handle.

16. An apparatus for an aircraft, comprising:
a latch fitting comprising a fitting channel;
a latch disposed in the fitting channel, the latch including a handle, a hook structure and a linkage system operatively coupling the handle to the hook structure, the linkage system including a mounting link, a handle pivot member and a link pivot member;
the hook structure including a hook, a structure aperture and a structure slot located longitudinally between the hook and the structure aperture;
the handle pivot member received within the structure aperture, and the handle pivot member pivotally connecting the handle to the hook structure; and
the link pivot member received within the structure slot, and the link pivot member pivotally connecting a back end of the mounting link to the hook structure; and
a fastener pivotally connecting a front end of the mounting link to the latch fitting to mount the latch to the latch fitting.

17. The apparatus of claim 16, wherein
the hook structure further includes a structure channel;
the fastener is disposed in the structure channel when the latch is in a latched position; and
the fastener is disposed outside of the structure channel when the latch is in an unlatched position.

18. The apparatus of claim 16, wherein
the link pivot member is an inter-link pivot member, and the linkage system further includes a front handle link and a back handle link;
the inter-link pivot member further pivotally connects a front end of the front handle link to the hook structure;
a back end of the front handle link is pivotally connected to the handle and to a front end of the back handle link; and
the handle pivot member further pivotally connects a back end of the back handle link to the hook structure.

19. An apparatus for an aircraft, comprising:
a latch including a handle, a hook structure and a linkage system operatively coupling the handle to the hook structure, the linkage system including a mounting link, a handle pivot member and a link pivot member;
the hook structure including a hook, a structure aperture, a structure slot and a structure channel, the structure slot located longitudinally between the structure channel and the structure aperture, and the structure channel located longitudinally between the structure slot and the hook;

the handle pivot member received within the structure aperture, and the handle pivot member pivotally connecting the handle to the hook structure; and the link pivot member received within the structure slot, and the link pivot member pivotally connecting the mounting link to the hook structure; and a fastener connected to the mounting link, the fastener disposed in the structure channel when the latch is in a latched position, and the fastener disposed outside of the structure channel when the latch is in an unlatched position.

\* \* \* \* \*